United States Patent [19]
Giovannetti

[11] Patent Number: 5,980,005
[45] Date of Patent: Nov. 9, 1999

[54] FRAME ASSEMBLY FOR FURNITURE

[76] Inventor: Antonio Giovannetti, Residenza Fontana Milano, 2-Segrate, Italy, 20090

[21] Appl. No.: 08/921,063

[22] Filed: Aug. 29, 1997

[30] Foreign Application Priority Data

Aug. 30, 1996 [IT] Italy ................... MI96A1813

[51] Int. Cl.$^6$ ........................................ A47B 47/00
[52] U.S. Cl. ........................................ 312/263; 403/230
[58] Field of Search .................. 312/257.1, 265.1, 312/265.2, 265.3, 265.4, 263, 265.5, 107, 108, 111; 403/230, 231, 205, 172, 300

[56] References Cited

U.S. PATENT DOCUMENTS

| 2,157,227 | 5/1939 | Brickman et al. | 403/300 X |
|---|---|---|---|
| 3,229,334 | 1/1966 | Thome | 403/231 X |
| 3,786,765 | 1/1974 | Burr | 312/111 X |
| 4,292,003 | 9/1981 | Pond | 403/231 X |
| 4,353,663 | 10/1982 | Glickman | 403/231 X |
| 4,518,278 | 5/1985 | Koch | 403/230 |
| 5,525,005 | 6/1996 | Chen . | |

FOREIGN PATENT DOCUMENTS

| 331478 | 8/1976 | Austria . |
|---|---|---|
| 858534 | 11/1940 | France . |
| 1283150 | 6/1962 | France . |
| 2142400 | 1/1973 | France . |

*Primary Examiner*—Janet M. Wilkens
*Attorney, Agent, or Firm*—Jacobson, Price, Holman & Stein, PLLC

[57] ABSTRACT

A structural assembly for forming furniture units is composed of horizontal structural elements (10,50) in the form of metal sections, vertical structural elements (101, 102, 103) in the form of panels, and jointing devices to join together said elements. The metal sections are hollow or have at least some hollow portions communicating with the outside. The metal joining devices (20,30) comprise a head of a suitable size to be accommodated inside the metal sections, preferably in a nonrotating manner, and a shank for engagement with a wood panel. The head of the joining device comprises a through hole having a stem extending along a diameter thereof that can be gripped by a conventional cam clamping device. The joining device can also include two aligned heads and a cavity forming a seat for a head of another joining device. The assembly makes it possible to create wardrobes, or furniture units in general, that do not have any visible metal parts on the inside.

12 Claims, 4 Drawing Sheets

FRAME ASSEMBLY FOR FURNITURE

DESCRIPTION

In the furnishing field there is a constant search for structures that combine a pleasing aesthetic appearance with strong versatile mechanics and can also be assembled easily and rapidly.

Already known to the art are structures made of metal, or partly of metal and partly of wood panels, for open or closed shelving units. These structures, however, cannot avoid leaving the metal components exposed.

The most widely used wardrobes are generally made of wood panels joined together by means of joints to form a structure with an attractive appearance. However, these structures leave the joining devices, which are generally metal, on view.

An aim of the present application is to be able to create furnishing structures, generally wardrobes, which, though having a metal structural part, do not leave metal parts on view when the structure is assembled.

A further aim is to create such a structure that can be easily completed with mechanical devices, such as rails for sliding doors and the like.

A further aim is to create such a structure that is also versatile.

The aforementioned aims have been achieved with a frame for furniture having structural vertical panel-shaped uprights, structural horizontal bars connecting the vertical panel-shaped uprights, joining devices for joining together the structural vertical panel-shaped uprights and bars, and horizontal cover panels applied to at least some of the structural bars so that said cover panels hide the structural bars as seen from inside of the frame, and a joining device for joining together structural bars and panels in a furniture frame having a head for engagement of the bars and a shank for engagement of a panel and engagement means for a clamping or anchoring device.

The assembly preferably also comprises a double-headed joining device comprising two aligned heads and a body that forms a housing for a further joining device as stated previously.

This simple structure makes it possible to assemble wardrobes that do not show any of their metal structural parts on the inside.

In addition, the sections, which are used as longitudinal stringers to support the panels, can be used in combination with, or made as part of, more complex sections suitable to form guide rails for sliding doors or the like.

The invention will be described below in greater detail with reference to the appended drawings in which it is illustrated by way of non-limiting example and in which.

Figure 1:
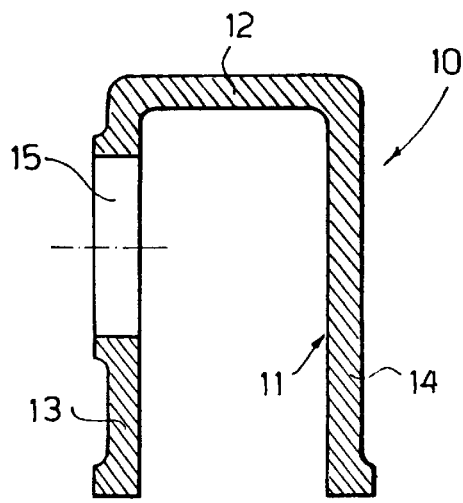
FIG. 1 is a cross sectional view through a section or profile which is part of a frame assembly according to the invention; the section is illustrated in an exemplary embodiment.

With reference firstly to FIG. 1, it shows an examplary of a section bar that can be used as longitudinal stringer in a frame of the invention.

The section bar, indicated with reference number 10 is U-shaped and hollow on the inside, its cavity being indicated by reference number 11. The cavity 11 is continuously or discontinuously in communication with the outside, for example through a mouth situated at the bottom in FIG. 1. The section 10, which, as an indication, comprises a base 12 and legs 13 and 14, can have at least one of the legs provided with one or more through holes indicated by 15, in suitable positions. The section 10, instead of being U-shaped in section, can be O-shaped, with the cavity 11 closed by a base and interrupted only in suitable positions to permit access from the outside.

Moreover, the section 10, instead of being a single element, can be part of a more complex section, also forming, for example, guide tracks for sliding doors or the like.

Figure 2:
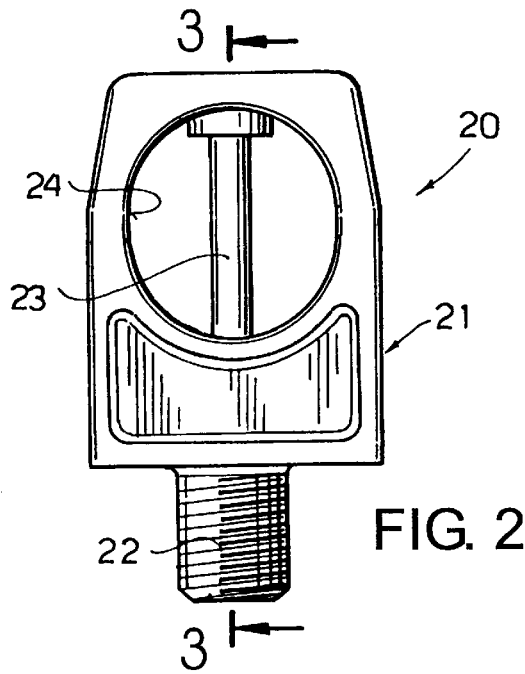
FIG. 2 is a front view on an enlarged scale of a first joining device according to the present invention.
Figure 3:
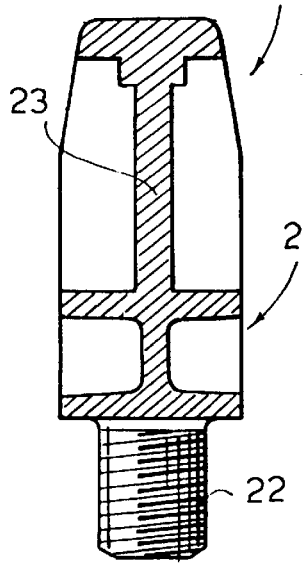
FIG. 3 is a sectional view of the device in FIG. 2 along the plane indicated by 3—3 in FIG. 2.

With reference now to FIG. 2, a joining device, or joint, indicated by 20, will now be described. The joining device 20 has a head 21 and a shank 22. The head is generally of such a size as to be able to be accommodated in the cavity 11 of the section 10, preferably so that it does not rotate. Said head is preferably substantially rectangular in shape in a plan view. However, other shapes are also possible. The head 21 preferably has a diametral stem 23 inside a through hole 24. The stem 23 is able to act as a clamping means for a cam clamping or anchoring device, such as the device marketed by EFFEGI BREVETTI S. r.l. under the name HELIBLOK, for example.

The clamping or anchoring device (not illustrated) is inserted through a hole 15 in the section and constrains the section and the joining device to each other.

Nevertheless, this clamping engagement between the joining device 20 and the clamping device can be made in any per se known manner, for example by means of a thread on the through hole 24 of the joining device and a corresponding thread in the clamping device (not illustrated). The shank 22 of the joining device 20 is threaded and the thread can be a metal thread, if the joining device is intended to engage with a metal bush contained in a panel, or a wood thread, if the joining device is intended to engage directly with the wood of a panel.

Figure 4:
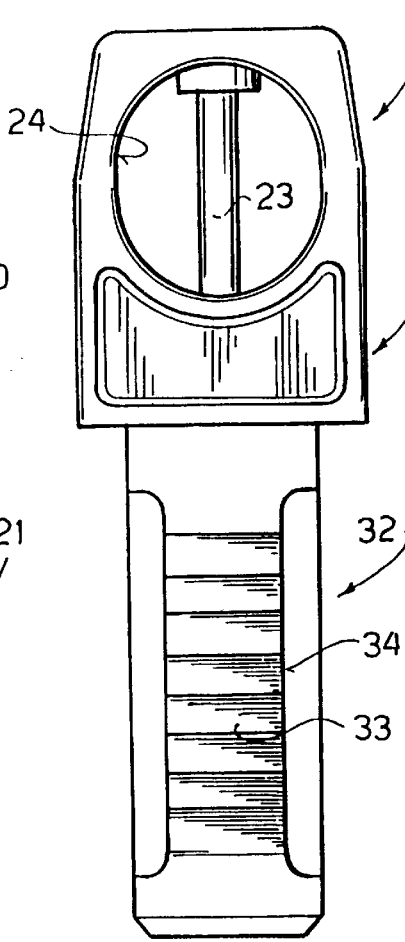
FIG. 4 is a front view of a modified embodiment of joining device.
Figure 5:
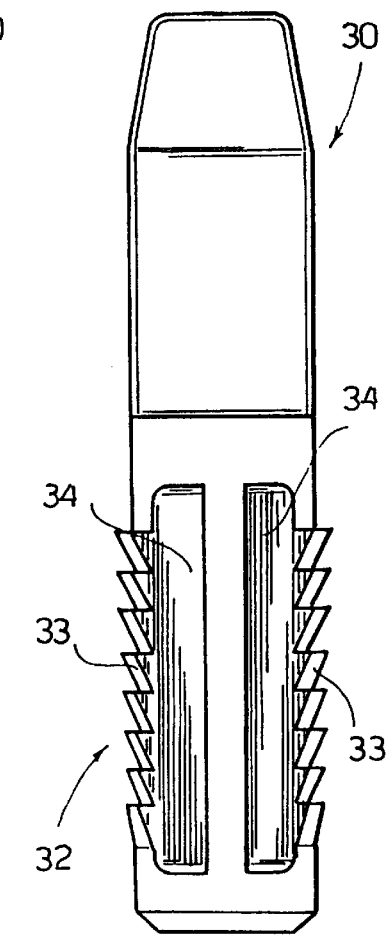
FIG. 5 is a side view from the right or the left of the device illustrated in FIG. 4.
Figure 3A:
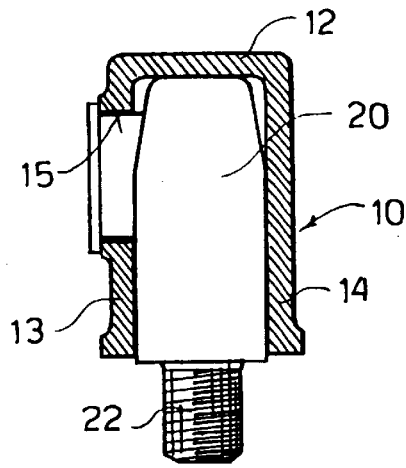
FIG. 3a is a sectional view of a section and a joining device engaged with each other.

FIGS. 4 and 5 show a modified embodiment of joining device indicated by reference number 30. The joining device 30 has a head 21 corresponding to the head 21 of the device 20, and therefore has the same reference numbers, which will not be repeated or explained in detail. The stem 32 of the joining device 30, in this case, comprises toothing with teeth 33 on at least two opposite faces, to engage the wood of a panel; the toothing can possibly be lightened with longitudinal grooves indicated by 34.

Figure 8A:
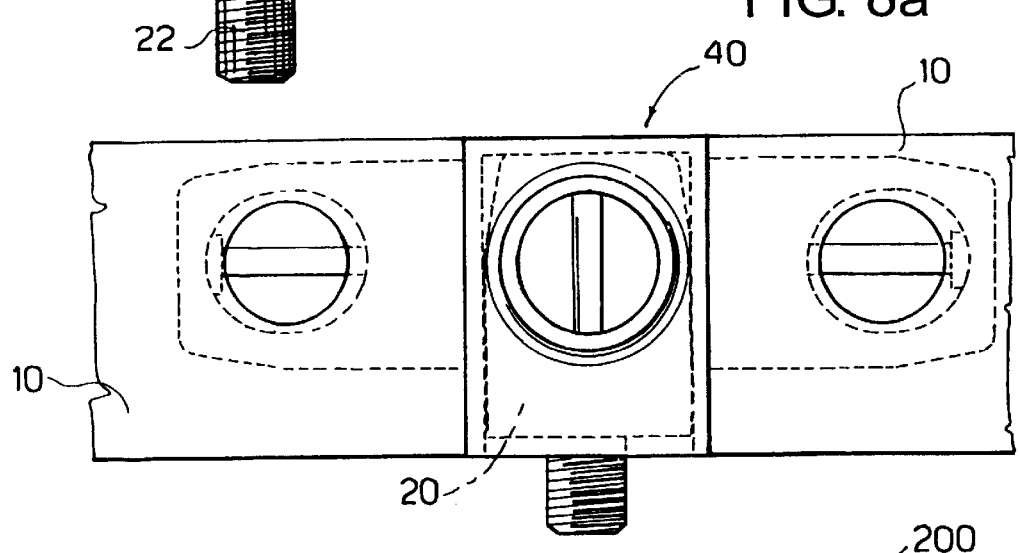
FIG. 8a is an illustration of two joints engaged with each other and with two portions of section.
Figure 6:
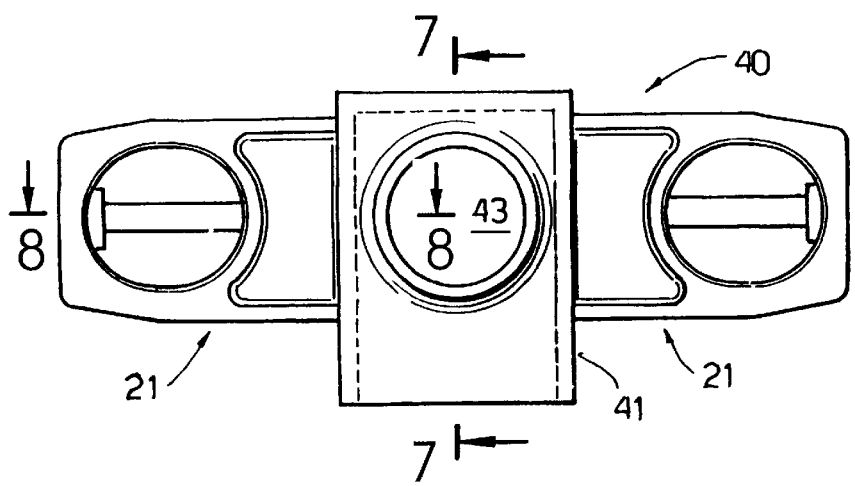
FIG. 6 is a front view, on a slightly smaller scale than the preceding illustrations, of a third type of joining device.
Figure 7:
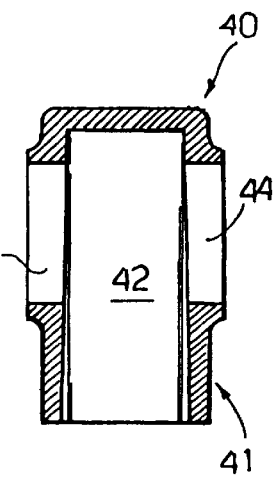
FIG. 7 is a cross sectional view of the joining device of FIG. 6 taken along plane 7—7 in said figure.
Figure 8:
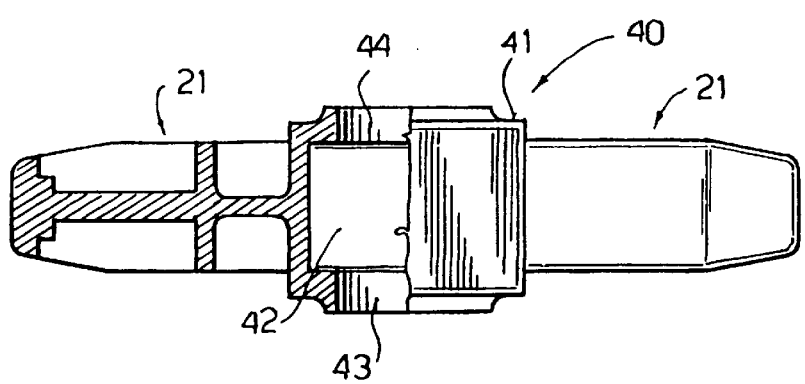
FIG. 8 is a illustration, partly as a top plan view of FIG. 6 and partly in sectional view along the plane indicated by 8—8 in said figure.

A further embodiment of joining device is indicated by reference number 40 in FIGS. 6, 7 and 8. The joining device 40 comprises a body 41 and two heads 21 in line with each other, on opposite sides of the body. The two heads 21, will not be further described here since they correspond to the head 21 described with reference to the device 20. The body 41 has a cavity 42 open on at least one side and preferably communicating with the outside through one or preferably two aligned holes 43, 44 with their axis transversal to the axis of the heads 21. The shape and size of the cavity 42 are such as to be able to accommodate a head 21 of a joining device like 20 or 30. The joining device 20 or 30 accommodated in the cavity 42 will then be fixed to the joining device 40 by means of a suitable clamping device as stated above, which will engage said joining device through one of the holes 43 or 44. A T-shaped joining means is thus obtained. The joining device 40 can be used to join the portions of section 10 so that they are aligned and/or, when it is joined to a joining device 20 or 30 accommodated in the cavity 42, it can be used to join two portions of section 10 to a panel (FIG. 8a).

Figure 9:
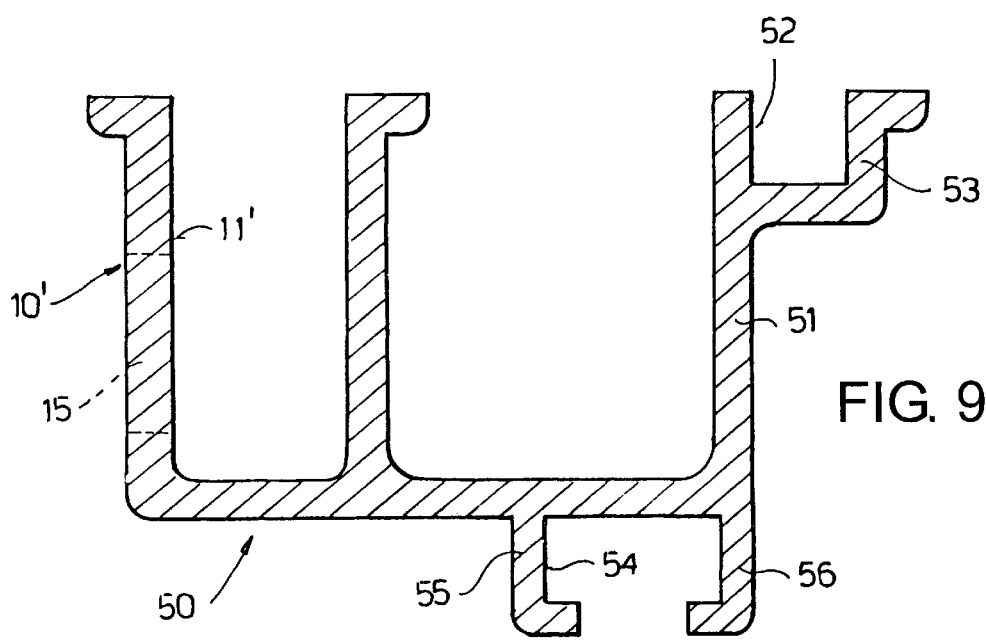
FIG. 9 is a cross sectional view through a variant of the section of the assembly according to the invention.

FIG. 9 shows a variant of the section, indicated by 50: The section 50 comprises a U-shaped part 10' basically corresponding to that shown in FIG. 1, though in an inverted position, that is to say with two legs that define an inner channel 11' suitable to accommodate the heads 21 of joining devices. The section 50 also has an additional leg 51 that forms a U-shaped seat 52 at the top, defined by an arm 53, for a purpose that will be explained below and in addition has a bottom seat 54 defined by arms 55 and 56. This bottom seat serves to allow insertion of a height adjuster to adjust the height of the bar with respect to the floor.

As has been said, further more complex sections can be provided, suitable to perform various functions provided that they comprise part 10, 10' for engagement of joint heads.

Figure 10:
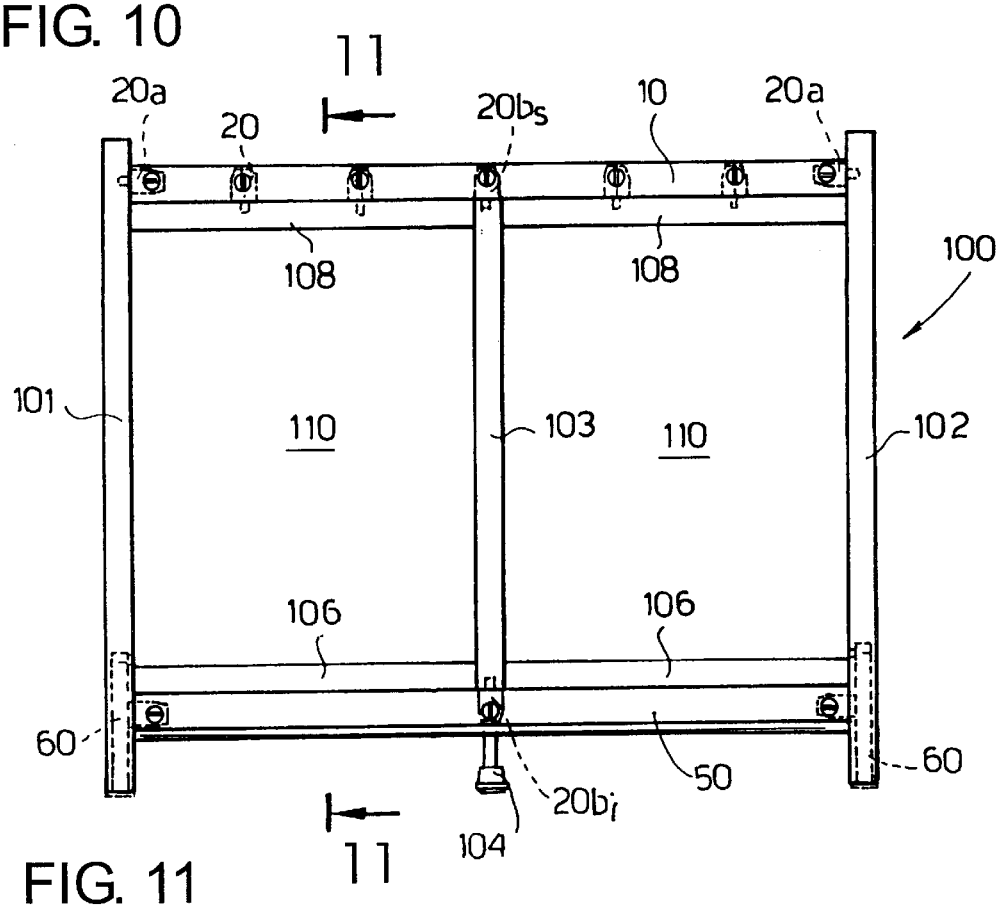
FIG. 10 is a front view on a reduced scale of an exemplary embodiment of a frame for a wardrobe or furniture unit of the present invention.
Figure 11:
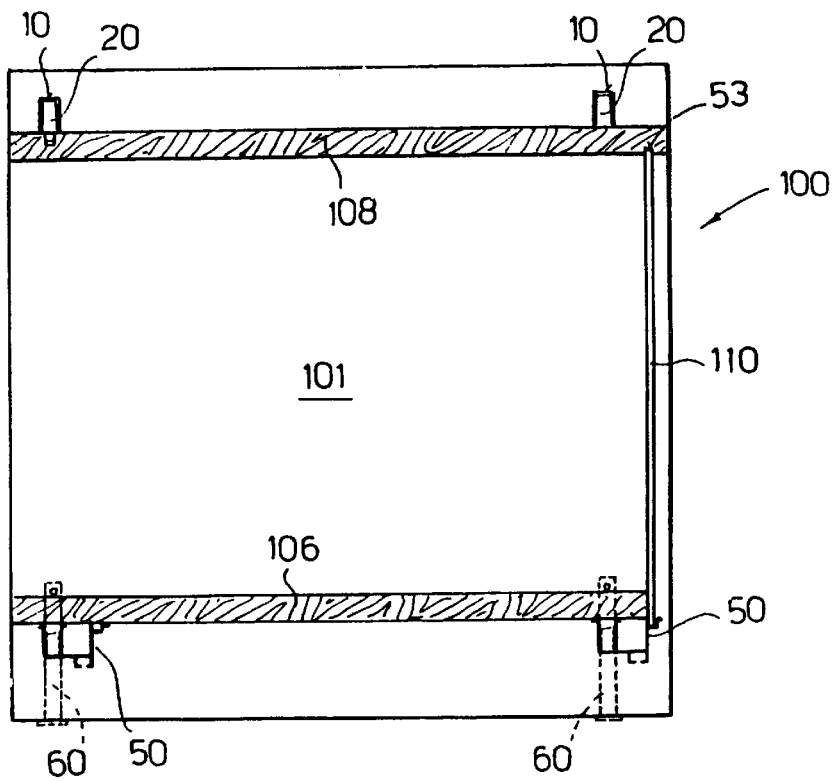
FIG. 11 is a sectional view along a vertical plane indicated by 11—11 in FIG. 10.

With reference now to FIGS. 10 and 11 an exemplary embodiment of a wardrobe frame obtained with the elements described hereto, combined with wood panels, will be described. The frame 100 in FIG. 10 comprises two vertical uprights or sides resting on the ground, indicated by 101 and 102 and consisting of wood panels. In an intermediate position a vertical upright 103 is provided, also consisting of a wood panel which may or may not be supported by a foot 104. The sides 101 and 102 are connected to each other by upper and lower longitudinal stringers or bars respectively comprising metal sections 10 and metal sections 50. A pair of sections 10 are situated at the top, the sections 10 being mounted on the sides 101 and 102 by means of joining devices of type 20 and 30, drawn by dash lines in FIG. 10 and indicated by 20a, positioned with their axes horizontal and having the stem engaged in panels 101 and 102. Alternatively, at the foot of the panels 101 and 102 use can be made of devices 60 with height adjustment as described in Italian application MI 94U 000256. One or more joining devices 20 and 30, indicated by 20b, disposed with their axes vertical, are engaged with an upper section 10 and the relative stem or shank is screwed or forced into panel 103. Likewise one or more joining devices 20b are engaged in the bottom sections 50 and engage the panel 103. It will be seen that the structure thus formed by the vertical sides 101 and 102 and by the longitudinal stringers consisting of the sections 20 and the sections 50 is statically very stable and is easy to assemble. Each compartment of the wardrobe is then completed by horizontal bottom panels indicated by 106 resting on the lower stringers 50. At the top, the compartment is closed by means of panels, generally wooden panels, 108, which are supported on bar sections 10 by means of joints of type 20 or 30 which are drawn in dash lines in FIG. 8a, and with a continuous line in FIG. 11. A rear closure panel 110 is accommodated with its lower edge in opening 52 rear section bar of section bars 50 and its upper edge in a suitable groove 53 in the top panels 108, as shown in FIG. 11.

The inside of the wardrobe thus formed has only the surfaces of panels 101, 103, 106, 108, 102 and 110 on view and all the metal components and the joints are hidden.

Figure 12:
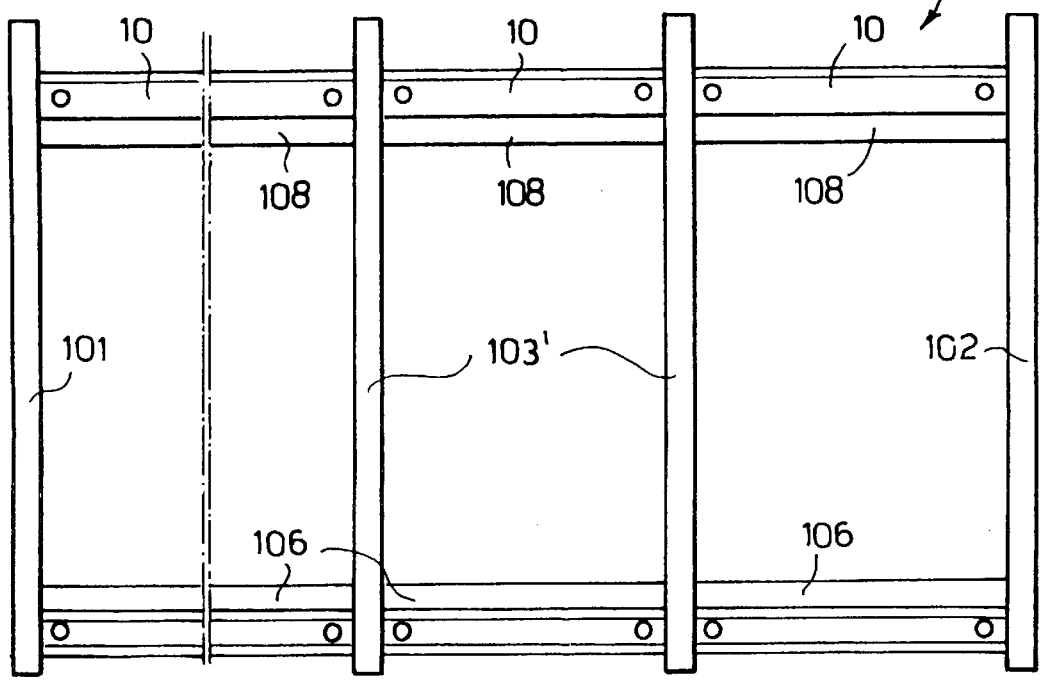
FIG. 12 is a front view of a modified embodiment of the frame.

Wardrobes can be made, with the frame of the invention, having more than two doors or compartments; they can also be made with sliding doors by replacing the front section bars 10 and 50 with more complex section bars, comprising rails on which the doors can slide. With few variants, moreover, wardrobes in which the inner dividing walls rest on the floor can be made, as illustrated in FIG. 12. In the wardrobe in FIG. 12, the inner dividing walls are indicated by 103' and 103', whilst for the other elements the notes used for the wardrobe in FIGS. 10 and 11 are used.

I claim:

1. A frame for furniture comprising structural vertical panel-shaped uprights, structural horizontal bars connecting said vertical panel-shaped uprights, joining devices for joining together said structural vertical panel-shaped uprights and bars, horizontal panels applied to at least some of said structural bars, said horizontal panels hiding said structural bars as seen from inside of the frame, said bars having cavities communicating with an outside surface of the bars at least in some parts thereof, said joining devices being suitable to be accommodated with at least a head thereof in one of said cavities, and having engagement means for a clamping or anchoring device wherein said head on at least one of said joining devices comprises an anti-rotation head suitable to be accommodated in a cavity of said cavities of the structural bars, said head on the joining devices having a through hole and a stem extending along a diameter of said hole, said stem forming said engagement means for said clamping or anchoring device.

2. A frame according to claim 1 wherein said bars comprise longitudinal U-shaped sections having at least one through hole in one of the legs of the U, in a position in which said bars have to accommodate one of said joining devices.

3. A frame according to 1 wherein at least one of said joining devices further comprises a shank with engaging means for engaging one of said horizontal panels, said shank extending from said head of the joining device.

4. A frame according to claim 3 wherein said shank is a threaded shank.

5. A frame according to claim 3 wherein said shank is a toothed shank, provided with teeth occupying the circumference or a portion of the circumference thereof, and transverse to the axis of the shank.

6. A frame according to claim 1, wherein at least one of said joining devices includes a hollow central body and two opposite heads extending in line with each other from said body.

7. A frame according to claim 6 wherein said hollow central body of said joining device having two opposite heads has a cavity suitable for accommodating a head of another joining device.

8. A frame according to claim 1 further comprising rear panels wherein at least one of said bars further comprises a longitudinal groove to accommodate an edge of one of said rear panels.

9. A joining device for joining together a structural bar and a panel in a furniture frame, said joining device comprising a bar engaging head for engagement of said bar and a panel engaging shank extending from the head, wherein said head has a through hole and a stem extending along a diameter of said hole, said stem forming an engagement means for a clamping device.

10. A joining device according to claim 9 wherein said panel engaging shank is a threaded shank or a toothed shank.

11. A joining device for joining together a structural bar and a panel in a furniture frame, said joining device comprising a central body, two opposite heads extending in line with each other from said body, said central body having a cavity open on at least one side, and at least a hole with its axis transverse to the axis of said heads, said opposite heads each having a hole and a clamp engaging stem in said hole.

12. A joining device according to claim 11 wherein said cavity of said central body is suitable for accommodating a head of a further joining device.

* * * * *